United States Patent Office 3,654,140
Patented Apr. 4, 1972

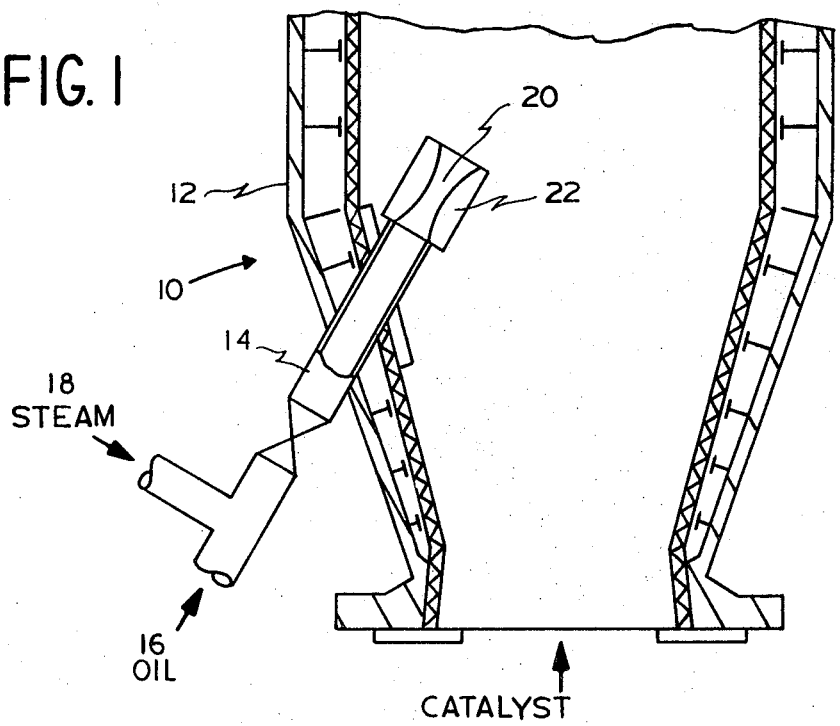
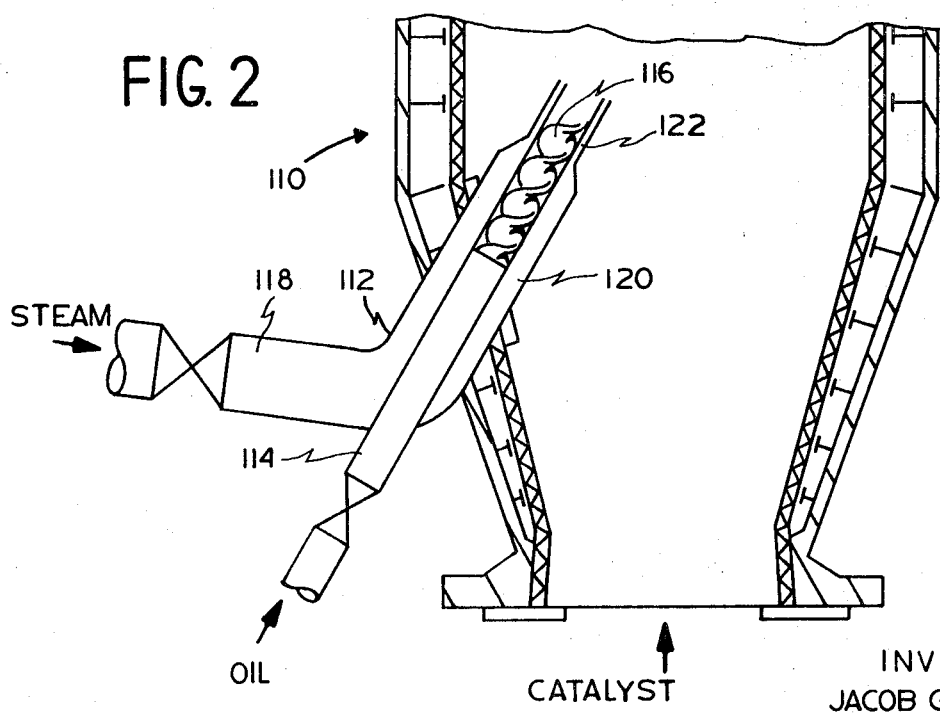

3,654,140
NOVEL CAT CRACKING OIL FEED INJECTOR DESIGN
Jacob Griffel, New York, N.Y., and Ivan Mayer, Summit, N.J., assignors to Esso Research and Engineering Company
Filed Aug. 12, 1970, Ser. No. 63,130
Int. Cl. C10g 11/00, 11/18
U.S. Cl. 208—113
7 Claims

ABSTRACT OF THE DISCLOSURE

An improved fluidized catalytic cracking process is provided which comprises feeding a substantially liquid hydrocarbon oil feedstock to at least one feed injection zone of a fluidized catalytic cracking reaction zone, concurrently feeding steam to said injection zone in a volumetric ratio of steam to liquid hydrocarbon ranging from about 3 to about 75, thereby imparting to the resulting mixture an exit velocity relative to the fluidized catalyst of at least about 100 feet per second, whereby the oil feedstock is essentially completely atomized forming droplets less than about 350 microns in diameter.

---

This invention relates to an improved fluidized catalytic cracking process. More particularly, this invention relates to the catalytic cracking of a hydrocarbon stream injected into the catalytic cracking zone in a substantially liquid phase.

Catalytic cracking of petroleum feedstock is well known. A wide variety of techniques have heretofore been employed to introduce the petroleum feedstock to the reaction zone which, as employed herein, is generally inclusive of transfer line reactors, dense bed feed risers, fluidized bed reactors and the like. Fluidized catalytic cracking reactors, especially transfer line reactors, are described in U.S. Pat. 2,902,432, U.S. Pat. 3,123,547 and U.S. Pat. 3,355,380. For example, it is known to preheat the hydrocarbon stream prior to injection into the reaction zone and to supply sufficient heat to the hydrocarbon feedstock to vaporize the hydrocarbon and inject it into the reaction zone as a vapor. However, the energy consumption to effect complete vaporization renders such preheating essentially uneconomic. Alternatively, the hydrocarbons can be introduced completely in the liquid phase. Introducing the feedstock in this manner, however, results in poor mixing of the feed with the fluidized catalyst; moreover, excessive coking and attendant product loss result.

It has now been found that the liquid feed vaporization rate appears to be the most important, potentially limiting, physical factor in a fluidized catalytic cracking reactor. Optimum performance would be realized with an all vapor feed since the most desirable reactions occur in the vapor phase and require extremely rapid movement of reactants to and from active catalytic sites. However, as indicated above, preheating of the feedstock to completely vaporize the stock prior to injection into the reactor adversely affects process economics. When a substantially liquid feedstock is employed, the time required for vaporization of the feed droplets reduces the time available for the desired catalytic reactions thus tending to reduce feed conversion per pass with a consequent adverse effect on yield. Still further, liquid wetting of the catalyst reduces the surface area which is available to catalyze hydrocarbon reactions and results in increased coke formation due to adsorption of the heavy fractions present in the feed or formed by polymerization. Consequently, the process duties of the stripper and regenerator are increased. Liquid droplets and wet catalyst can also deposit as coke on walls of the reactor and on the reactor grid (as for example in a dense bed unit).

Thus, it has been found that the nature of the feed injection zone in the catalytic cracking reactor is critical. It must provide uniform distribution of the feedstock over the cross section of the reaction zone to enable optimum contacting of the oil and catalyst. In addition, essentially complete atomization of any unvaporized feed must be effected as fast and as close to the injection zone as possible.

Proper feed injection is less critical in a dense bed unit than in a transfer line reactor. In a dense bed unit, initial contact between oil and catalyst must be sufficient to generate a large volume of vapor by vaporization and cracking and to avoid forming large slugs of oil-wet catalyst. However, most of the cracking can occur in the dense bed where the contact time can be varied by changing the catalyst hold-up. Moreover, the reactor grid, if properly designed, provides good distribution and promotes good contacting. In a transfer-line reactor, however, the feed injection zone must provide both good contacting and a high degree of atomization. All conversion must be attained within the transfer-line reactor. The "forgiveness" provided by the grid and hold-up flexibility in a dense-bed unit are not available. Desirable cracking will not begin until the oil has been vaporized and well distributed. In a transfer line reactor, however, the total oil residence time is only on the order of about 3–7 seconds. Thus, the amount of time taken to achieve vaporization is critical. The more time taken for vaporization, the less time available for conversion.

Accordingly, it is an object of the present invention to provide an improved fluidized catalytic cracking process which overcomes the above-noted deficiencies.

It is another object of the present invention to provide an improved process whereby substantially liquid feeds are vaporized very rapidly.

It is still another object of the present invention to provide an improved process wherein high feed vaporization rates are obtained by providing essentially instantaneous and uniform contact between all of the liquid feed and the cross section of the fluidized catalyst in the area of the feed-injection zone.

It is a still further object of the present invention to provide an improved process wherein a substantially liqiud feed can be vaporized almost completely in about one second or less by atomizing the liquid into droplets less than about 350 microns preferably less than 100 microns in diameter. With such a fine dispersion, the liquid does not have to come in direct contact with the solids for rapid vaporization. Heat flows rapidly by thermal conduction through non-turbulent vapor from the hot solids to the bulk vapor stream and evaporates the liquid droplets without direct contact with the catalyst.

These as well as other objects are accomplished by the present invention which provides an improved fluidized catalytic cracking process comprising feeding a substantially liquid hydrocarbon oil feedstock to at least one feed-injection zone of a fluidized catalytic cracking reaction zone, concurrently feeding steam to said injection zone in a volumetric ratio of steam to liquid hydrocarbon ranging from about 3 to about 75, thereby imparting to the resulting mixture an exit velocity relative to the fluidized catalyst of at least about 100 feet per second, and preferably about 300 feet per second, whereby the oil feedstock is essentially completely atomized forming droplets less than about 350 microns in diameter at a pressure drop across said feed-injection zone of less than about 50 p.s.i.

It has been found in accordance with the present invention that essentially complete atomization can be attained in the injection zone through operation at high relative exit velocities of at least about 100 feet per second, relative to the velocity of the fluidized catalyst, but with only a 20 to 50 p.s.i. pressure drop taken across the injection zone itself. This is accomplished in accordance with the present invention by the use of additional injection steam. The amount of steam required will generally range from about 0.5 to about 2.5 weight percent with partially vaporized feeds, to from about 2.5 to about 5 weight percent with essentially all liquid feeds. Thus, the volumetric ratio of steam to liquid hydrocarbon charged to the injection zone can range from about 3 to about 75.

It has heretofore been considered that a high exit velocity from a feed injector is required in order to achieve atomization. High velocity, however, has always been associated with a concomitant high pressure drop across the feed injector. This can be seen from the equation describing the stable equilibrium droplet size emerging from a simple pressure nozzle. This equation is derived by equating the drag force and interfacial forces acting on a droplet at the shattering velocity as follows:

$$\frac{C_d}{2} \frac{\rho_f V^2}{g} \frac{\pi d^2}{4} = \pi d \sigma$$

$$d = \frac{8 g \sigma}{C_d \rho_f V^2}$$

where $V$=relative velocity between droplet and continuous phase (in oil injector case, the moving bed velocity), ft./sec.
$C_d$=drag on drop, dimensionless (equals 2.67 for gas bubbles in turbulent flow; can be more than an order of magnitude less for liquid drops in turbulent flow).
$d$=droplet diameter, ft.
$g$=gravitational constant, 32.2 ft./sec.$^2$
$\rho_f$=density of continuous phase, #/ft.$^3$ (gas density of moving bed).
$\sigma$=interfacial tension, #/ft.

For a typical riser design using an all liquid feed where the exit velocity is about 100 ft./sec., continuous phase velocity 0.5 ft./sec., $\sigma$ about 25 dynes/cm., $C_d$ equal to 0.267 or less, and $\rho_f$ about 0.1 #/ft., the calculated droplet size is at least as small as 350 microns. A velocity of about 300 ft./sec. would be required to attain a minimum droplet size of about 60 microns. Consequently, in terms of energy at least about 1400 ft.-lb./lb. oil would be required for proper atomization. However, the high exit velocity would also require a very high pressure drop through the nozzle.

It has been found in the present invention that small increases in the steam rate impart sufficient energy to the stream to enable the obtainment of essentially complete atomization with only a small attendant increase in pressure drop across the nozzle. Moreover, increasing the steam rate also increases feed vaporization which is beneficial. In addition to increasing the steam rate, it is considered preferable to increase the preheat temperature of the oil feed in order to lower the oil viscosity and surface tension and to permit as much vaporization as possible to occur.

The actual droplet size distribution obtained from a given injector depends on a great many variables. These include physical properties of the liquid sprayed (viscosity, density, surface tension and the like), physical properties of the stream into which the liquid is sprayed (viscosity and density), operating variables such as liquid and gas velocities, and the geometry of the particular injector with respect to size and type. Among the above liquid and gas physical properties, only the liquid surface tension and viscosity vary greatly over the range of temperature employed in catalytic cracking. For example, the surface tension of a given liquid can decrease from 20–25 dynes/cm. at 400° F. to 5–10 dynes/cm. at 800° F. Thus, if an all liquid feed is employed in a reaction zone, it is considered preferable to preheat the feed to temperatures ranging from about 200° to about 800° F. to reduce the surface tension of the oil as much as possible. Moreover, at higher preheat temperatures such as about 800° F. almost all feed will be partially vaporized at the injector nozzle discharge. Thus, the increased vaporization obtained through both increasing the preheat temperature and increasing the steam rate serves the following functions: (1) vaporization causes flashing of the oil within the nozzle which in itself causes turbulence and promotes atomization; and (2) the vaporized oil aids in achieving the desired high nozzle exit velocity with a reduced quantity of injection steam.

In order to assure uniform distribution of the atomized oil into the reactor, it is considered preferable to employ a plurality of nozzles in accordance with the present invention spaced about the periphery of the reactor. Most preferable, small sized injectors are employed to minimize the consequence of jetting into the reaction zone and attriting catalyst. Preferably, the reaction zone diameter can range from about 25 to about 100 times the injector diameter depending upon angle of entry to minimize jet penetration.

The present invention may be more fully understood by reference to the drawing, wherein:

FIG. 1 is a schematic illustration of one embodiment of a feed injection nozzle adapted to operate in accordance with the present invention.

FIG. 2 is a schematic illustration of an alternate embodiment of a feed injection nozzle suitable for use in the present invention.

Referring now to FIG. 1, there is shown the lower portion of a transfer line reactor generally designated 10 comprising an oil feed riser 12 containing regenerated catalyst flowing from a catalyst regenerator (not shown). A feed injector nozzle shown generally as 14 is shown in position in the riser. Although not shown, it is to be understood that a plurality of similar nozzles can be equally spaced around the perimeter of the reactor in essentially the same plane. A substantially liquid hydrocarbon feedstock 16 is fed to the feed injection nozzle 14 together with a stream of high velocity steam 18. To minimize the frictional pressure drop in accordance with the present invention, the oil injector diameter necks down in a streamlined fashion to give the desired exit velocity at throat 20. Nozzles must be streamlined to prevent liquid accumulation on walls of nozzles which have been shown to result in excessive pressure drops. To promote a spray angle and thus minimize jetting tendencies, the nozzle flares out at the discharge end thereof 22. High nozzle exit velocities can cause catalyst attrition. This effect is small however, at the exit velocities employed in the present invention wherein the energy levels are similar to that of air conventionally employed at the regenerator grid with a conventional 2 p.s.i. pressure drop. An injection zone of this type imparts a great deal of flexibility to the process in that it is capable of always yielding the desired outlet velocity by varying the steam rate as the inlet and feed temperatures are changed. It is to be understood that recycle streams can also be charged in conjuction with the hydrocarbon feed. If desired, the feedstock can be first charged to a heating zone to be preheated as described hereinabove and then passed into the nozzle 14.

Turning now to FIG. 2, there is shown an alternate embodiment of the present invention wherein a modified injection nozzle 112 is shown in position in reactor 110. The injection nozzle 112 is comprised of an inner tube 114 adapted to receive the liquid hydrocarbon feedstock. Proximate the discharge end of said tube is situated a spiral or helix 116 adapted to impart a spiral motion to the liquid feed stream thereby creating a relatively high tangential velocity causing the fluid to exit from the nozzle in the form of a hollow conical sheet which tends to break up into droplets. Surrounding the oil feed tube 114 is a tube 118 of a larger diameter concentrically disposed about inner tube 114 for at least a portion of its length forming an annular passageway 120 through which high velocity steam can pass. The partially atomized oil leaves inner tube 114 as an expanded cone which is then fractured under high shear into droplets by contact with a relatively small quantity of high velocity steam emanating from annular passageway 120. Because of the tangential velocity components imparted to the oil emanating from the feed injection nozzle, the steam passing through annular passageway 120 contacts the expanding cone of partially atomized oil substantially perpendicular to its flow path thereby rapidly breaking said cone into discrete and small droplets. The resulting mixture of oil droplets and steam leave the feed injection nozzle at relative low velocities generally in the order of about 100–300 ft./sec. Since the oil feedstock leaves the injection nozzle at a relatively low velocity and in an essentially atomized condition the possibility of jetting through the reaction zone and/or of attriting the catalyst are minimized.

Employing the process of the present invention, liquid hydrocarbon feedstock can be fed through nozzles such as shown in FIGS. 1 and 2 at relatively low velocities of from about 20 to about 50 ft./sec. The steam velocity is generally on the order of about 300 to about 500 ft./sec. Preferably, steam velocities of about 1000 to 1800 ft./sec. can be attained in oil injectors of the present invention using normal 125 p.s.i.g. steam by operating at sonic to supersonic conditions. The velocity of the steam imparts sufficient energy to the stream to cause rapid atomization of the liquid hydrocarbon feedstock without the attendant high pressure drop heretofore obtained at high liquid hydrocarbon flow rates. In the embodiment shown in FIG. 2, contact between the steam and oil is made proximate the exit of the injection nozzle and rapid atomization occurs due to the high shear forces imposed upon the liquid.

Atomization of the liquid hydrocarbon feedstock is obtained in accordance with the present invention through use of large relative volumes of steam as compared to the liquid hydrocarbon. The more steam employed, that is, the greater the volume of gas to volume of liquid ratio, the finer the atomization. It has been found in accordance with the present invention that use of a volumetric ratio of steam to liquid oil ranging from about 3 to about 75 generally amounting to from about 0.5 to about 5% by weight steam is sufficient. To minimize the upstream pressure drop on the steam, due to the exit velocities obtained, a tapered annulus 122 can be employed. The relatively high velocity zone can thus be limited to the region proximate the injector outlet.

In order to obtain the desired droplet size of less than about 350 microns and preferably, less than about 100 microns, it is also necessary that the effluent stream from the injection zone entering the reaction zone enter at a high relative velocity as compared to the velocity of the fluidized catalyst in the reaction zone. Generally, relative velocities of the effluent stream to the fluidized catalyst greater than about 100 feet per second and preferably from about 100 to about 300 feet per second have been found suitable.

Through use of the process of the present invention, effective atomization of the liquid hydrocarbon feedstock is obtained with a relatively small attendant pressure drop across the feed injection nozzle. Thus, the feed injection nozzles of the present invention do not effect atomization by conventional hydraulic or pneumatic techniques. Instead, atomization is provided with a small attendant pressure drop by a combination of the relative velocities of the steam as compared to the liquid feed stream as well as the relative velocity of the effluent stream from the feed injection nozzles as compared to the velocity of the fluidized catalyst bed. The pressure drop across a nozzle such as a straight tube with a streamlined tip and an $L/D$ ratio of from about 10 to 20 (such as shown in FIG. 1) can be expressed by the equation $$\Delta P = \frac{1.6 \rho_g V_g^2}{2g \cdot 144} + (1 \text{ to } 1.6) \frac{2 W_L V g^2}{2g \cdot 144}$$

wherein:

$V_g$ = velocity gas, ft./sec.
$\rho_g$ = gas density, lbs./ft.$^3$
$g$ = 32.2 ft./sec.$^2$
$W_L$ = lbs. liquid/ft.$^3$ exit gas
$\Delta P$ = p.s.i.

For nozzles using non-streamlined tips, however, the constant in the second term (the number of velocity heads) increases sharply.

The following example further defines, describes and compares specific aspects of the fluidized catalytic cracking process of the present invention. Parts and percentages are by weight unless otherwise indicated.

EXAMPLE 1

In this example, a conventional catalytic riser-cracking unit is modified by inserting ten evenly spaced 1½ diameter feed nozzles of the type shown in FIG. 1 around the perimeter of the riser near the base thereof.

A combination of various gas oils having a specific gravity at 60° F. of 0.936 and a viscosity of 54.24 Saybolt seconds at 210° F. and boiling within the range of 510° F. to 1170° F. is preheated to 749° F. and charged to the feed nozzles at a total feed rate of 161,000 lbs./hr. Steam is also charged to the feed nozzles at a total rate of 6950 lbs./hr. amounting to 2.7 weight percent based on total feed. The volumetric ratio of steam to liquid hydrocarbon is about 60. The temperature within the reactor is maintained at 930° F. The pressure within the reactor is 28.2 p.s.i.a. The pressure drop across the nozzles is less than about 30 p.s.i. Under these conditions, the discharge velocity from the feed nozzles is about 300 ft./sec.; whereas the velocity of the fluidized solids in the riser prior to contact with the effluent from the feed nozzles is about 5–10 feet per second, resulting in essentially complete atomization of the feed stream immediately upon entry into the reactor.

It is found that the coke and $C_3$ to $C_5$ gas yield decreases with an accompanying increase in naphtha yield.

What is claimed is:

1. An improved fluidized catalytic cracking process comprising feeding a substantially liquid hydrocarbon oil feedstock to at least one feed injection zone of a fluidized catalytic cracking reaction zone, concurrently feeding steam to said injection zone in a volumetric ratio of steam to liquid hydrocarbon ranging from about 3 to about 75, thereby imparting to the resulting mixture an exit velocity relative to the fluidized catalyst of at least about 100 feet per second, whereby the oil feedstock is essentially completely atomized forming droplets less than about 350 microns in diameter.

2. Process as defined in claim 1 wherein the pressure drop across said feed injection zone is less than about 50 p.s.i.

3. Process as defined in claim 1 wherein the steam fed to the injection zone ranges from about 0.5 to about 5 weight percent based on the total feed.

4. Process as defined in claim 1 wherein the oil feedstock is preheated prior to injection into the reaction zone at temperatures ranging from about 200° to about 800° F.

5. Process as defined in claim 1 wherein the oil feedstock is fed to the injection zone at a velocity ranging from about 20 to about 50 feet per second.

6. Process as defined in claim 1 wherein the velocity of the steam in the injection zone ranges from about 300 to about 1800 feet per second.

7. Process as defined in claim 1 wherein the velocity of the resulting effluent mixture entering the reaction zone relative to the velocity of the fluidized catalyst in the reaction zone ranges from about 100 to about 300 feet per second.

References Cited

UNITED STATES PATENTS

| | | | |
|---|---|---|---|
| 1,702,540 | 2/1929 | Hessle | 208—113 X |
| 2,464,810 | 3/1949 | Hirsch et al. | 208—113 X |
| 2,749,288 | 6/1956 | Watkins | 208—113 X |
| 2,768,935 | 10/1956 | Watkins | 208—113 X |
| 2,929,774 | 3/1960 | Smith | 208—113 |
| 3,042,196 | 7/1962 | Payton et al. | 208—113 |
| 2,284,581 | 5/1942 | Kuhl | 208—157 X |
| 2,362,270 | 11/1944 | Hemminger | 208—157 X |
| 2,595,759 | 5/1952 | Buckland et al. | 208—157 X |
| 3,071,540 | 1/1963 | McMahon et al. | 208—157 X |
| 3,152,065 | 10/1964 | Sharp et al. | 208—157 |

TOBIAS E. LEVOW, Primary Examiner

P. F. SHAVER, Assistant Examiner

U.S. Cl. X.R.

208—157